June 8, 1948. C. T. DARE 2,442,868
MACHINE TOOL
Filed April 9, 1943 9 Sheets-Sheet 1

Inventor
Curtis T. Dare
By
Parker, Carlson, Pitzner + Hubbard
Attorneys.

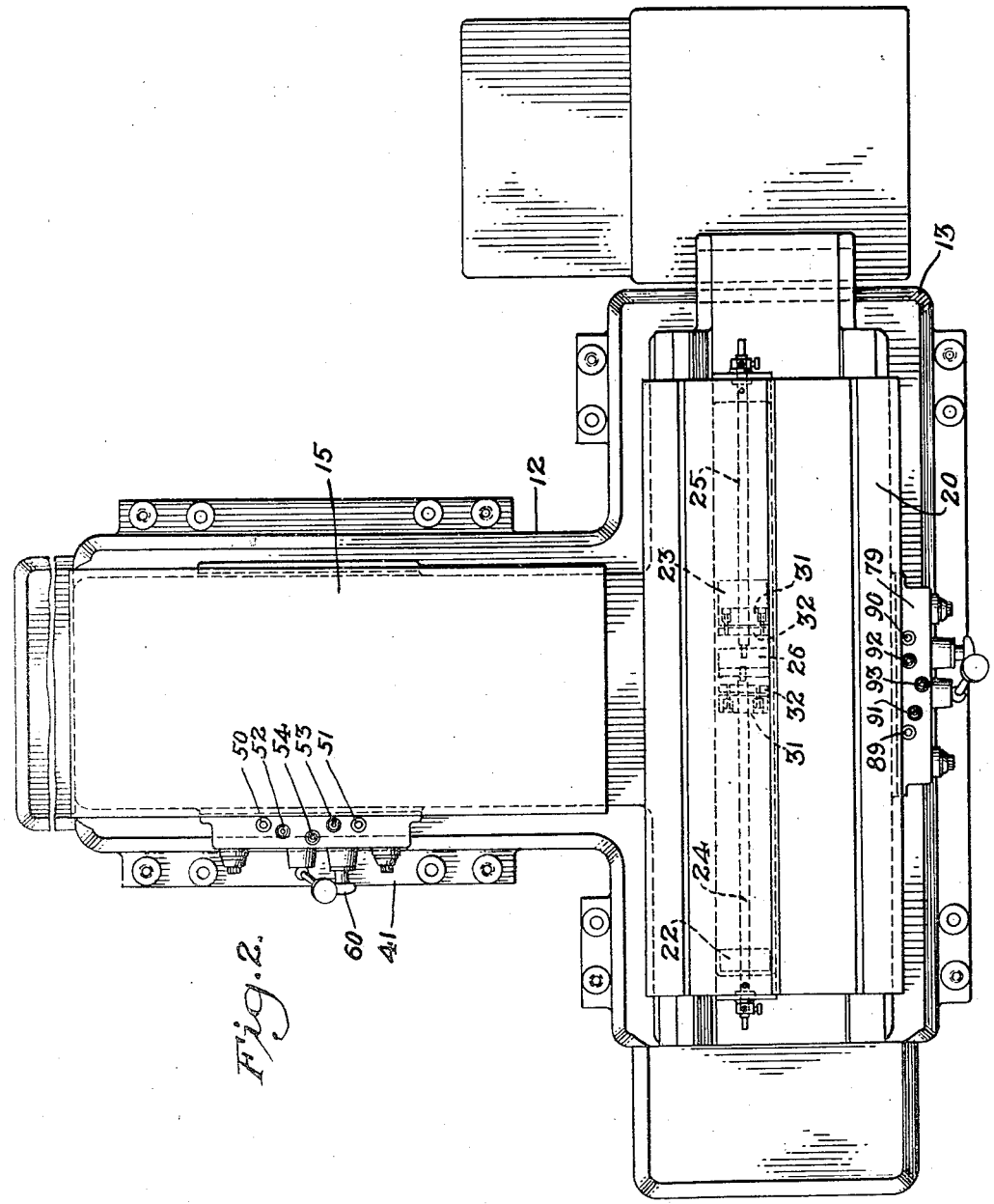

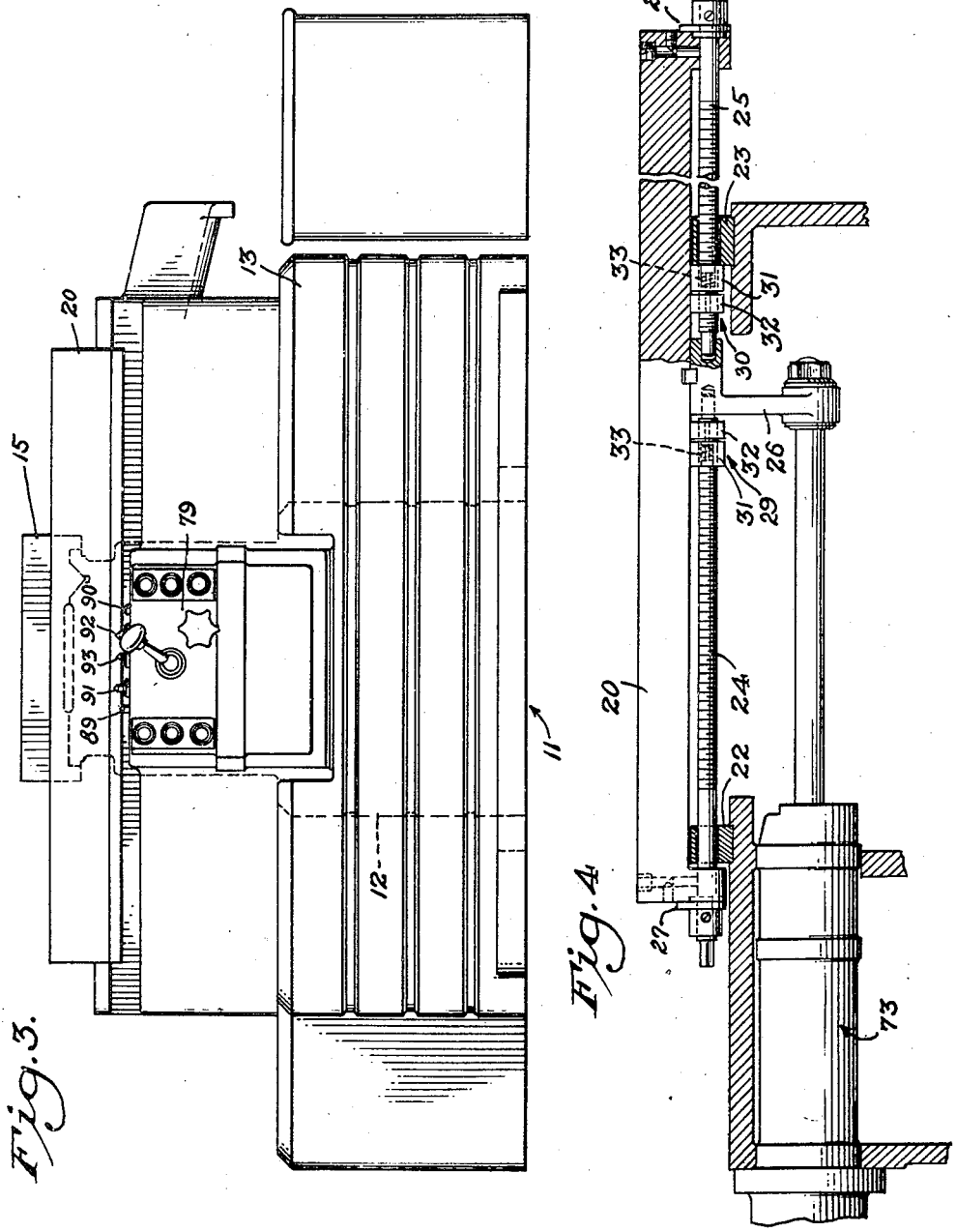

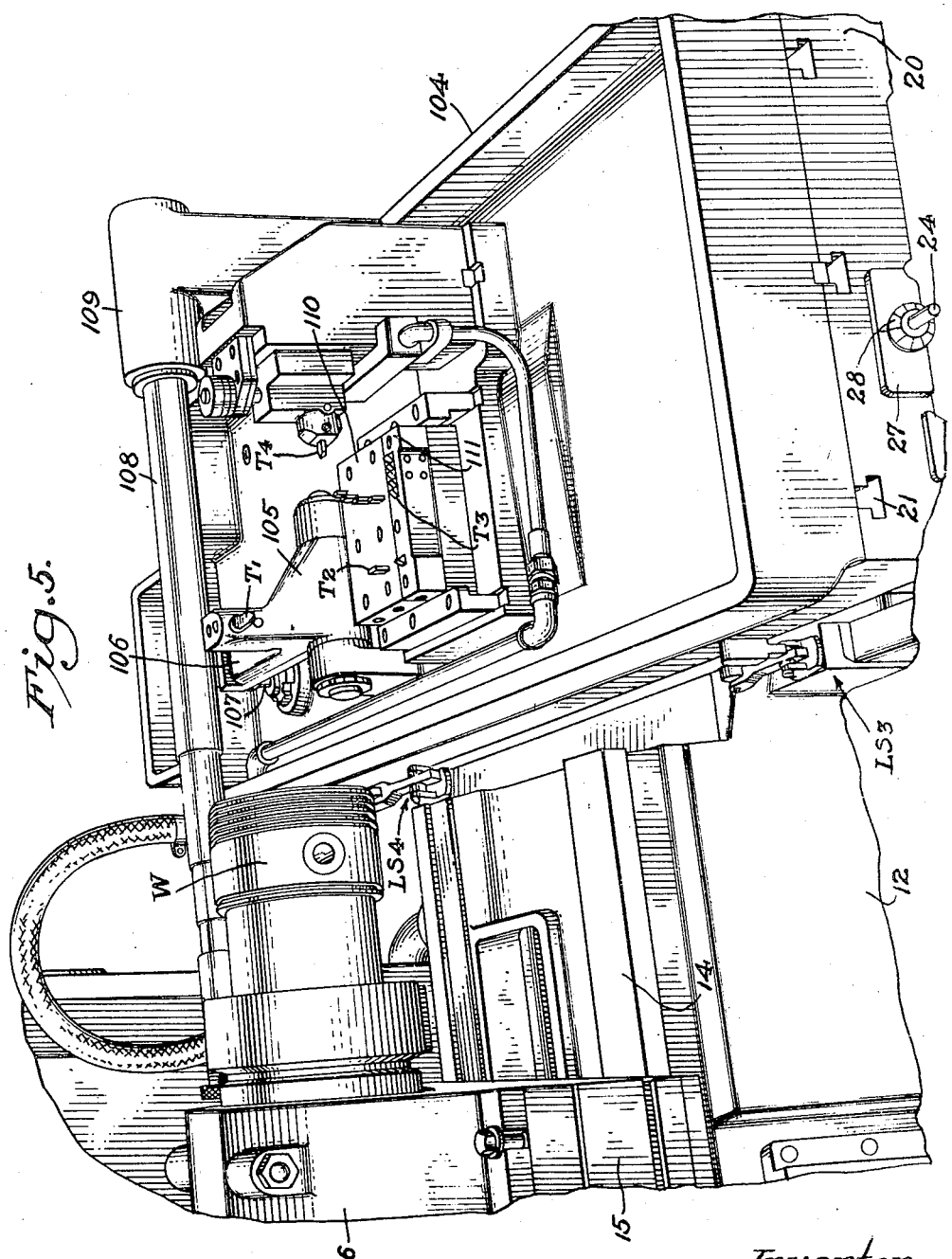

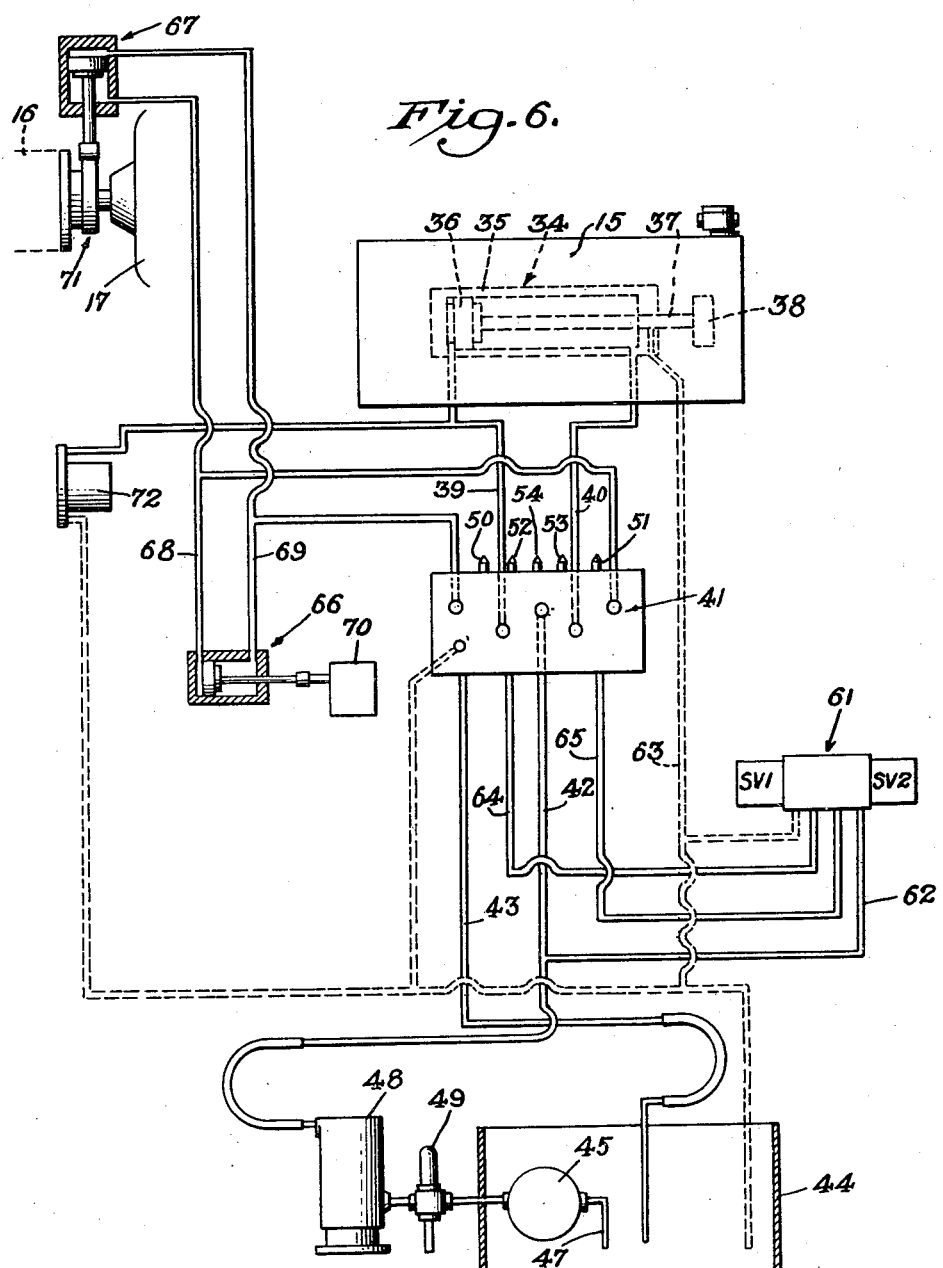

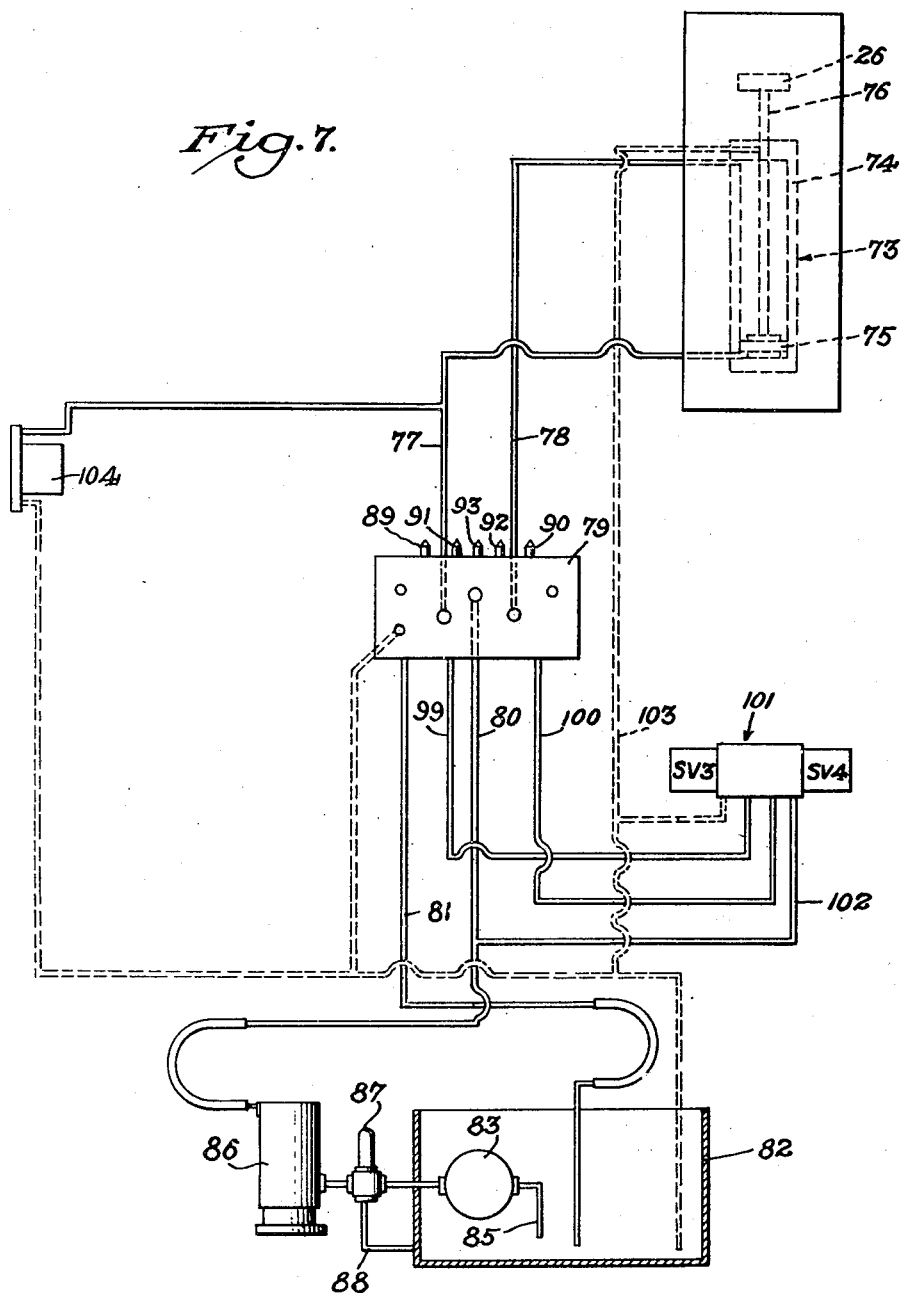

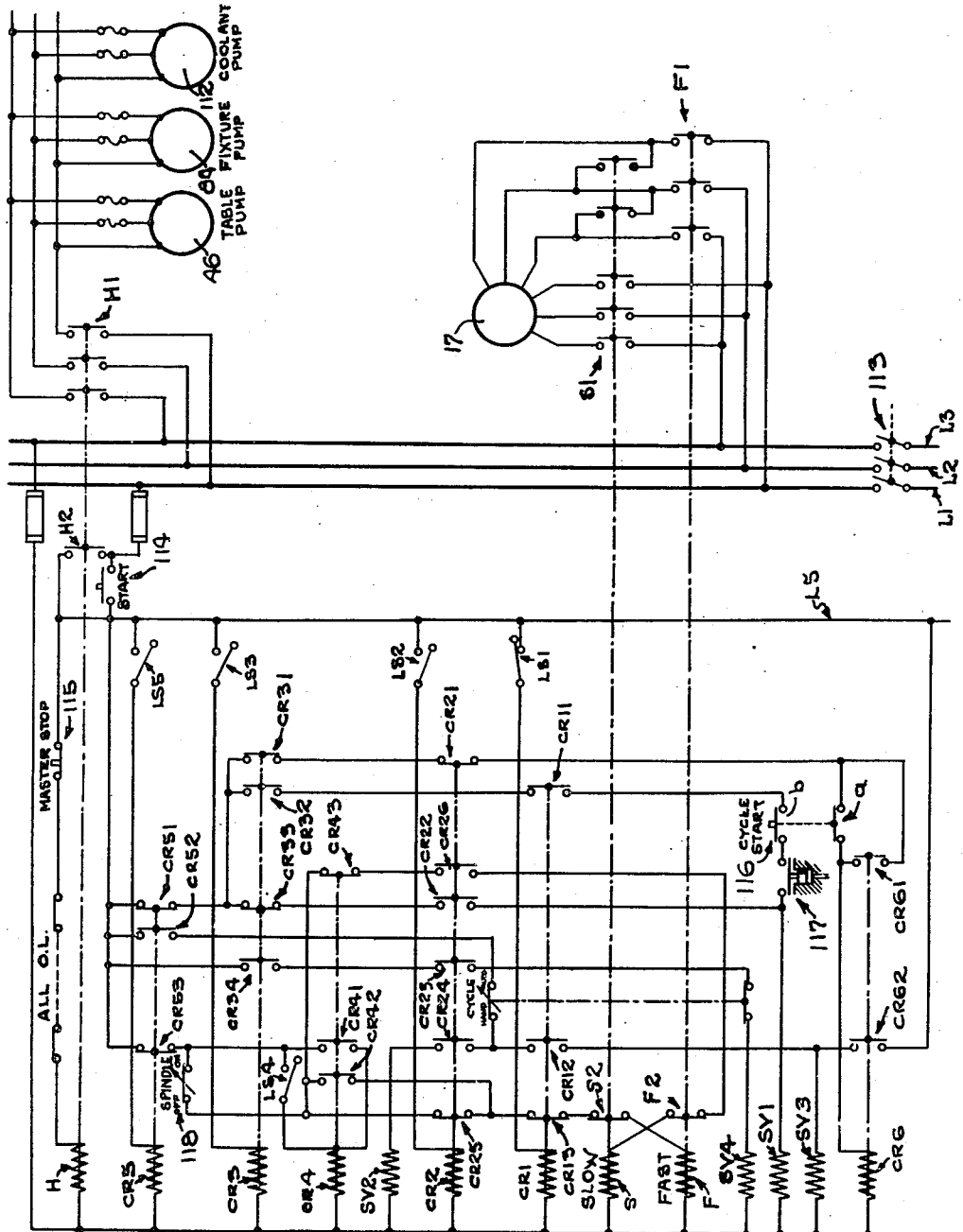

June 8, 1948.     C. T. DARE     2,442,868
MACHINE TOOL

Filed April 9, 1943     9 Sheets-Sheet 9

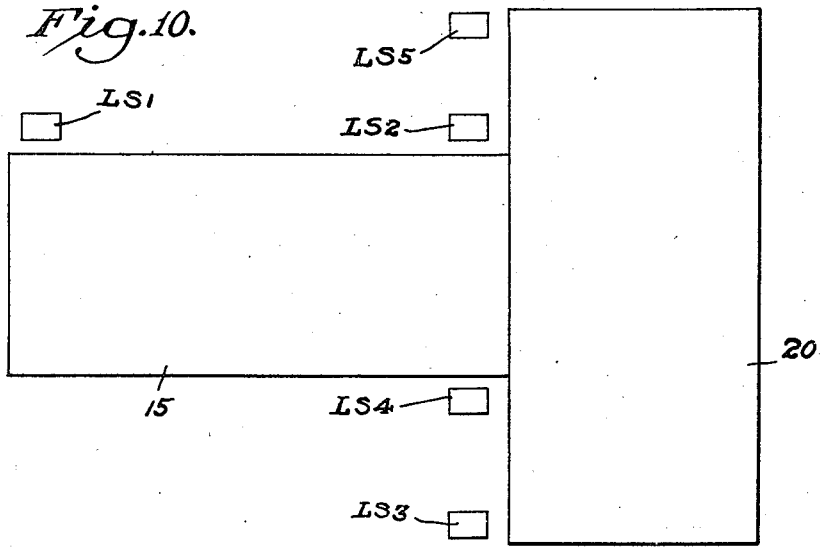

| MACHINE CYCLE | OPERATING COILS + SOLENOIDS ||||||||||||||
| --- | --- | --- | --- | --- | --- | --- | --- | --- | --- | --- | --- | --- | --- |
| | H | CR1 | CR2 | CR3 | CR4 | CR5 | CR6 | SLOW | FAST | SV1 | SV2 | SV3 | SV4 |
| START HYD. | ▓ | ▓ | | | | | | | | | | | |
| LOAD + CLAMP PART | ▓ | ▓ | | | | | | | | | | | |
| PRESS START CYCLE | ▓ | ▓ | | | | | ▓ | | ▓ | | ▓ | | |
| LS1-DISENGAGED | ▓ | | | | | | ▓ | | ▓ | | ▓ | | |
| LS2-ENGAGED | ▓ | | ▓ | | | | | | | | | | ▓ |
| LS3-DISENGAGED | ▓ | | ▓ | ▓ | | | | | ▓ | | | | |
| LS4-MOMENTARILY ENGAGED | ▓ | | ▓ | ▓ | ▓ | | | | ▓ | | | | |
| LS5-ENGAGED | ▓ | | | ▓ | | ▓ | | | | | | ▓ | |
| LS2-DISENGAGED | ▓ | | | ▓ | | ▓ | | | | | | | |
| LS1-ENGAGED | ▓ | ▓ | | | | | | | | | ▓ | | |
| LS5-DISENGAGED | ▓ | | | ▓ | | | | | | | | ▓ | |
| LS3-ENGAGED | ▓ | ▓ | | | | | | | | | | | |

Inventor
Curtis T. Dare
BY
Parker, Carlson, Pitzner & Hubbard
Attorneys.

Patented June 8, 1948

2,442,868

UNITED STATES PATENT OFFICE 2,442,868

MACHINE TOOL

Curtis T. Dare, Detroit, Mich., assignor to Ex-Cell-O Corporation, Detroit, Mich., a corporation of Michigan Application April 9, 1943, Serial No. 482,418

6 Claims. (Cl. 82—2)

The present invention relates to improvements in machine tools, and has particular reference to a new and improved machine in which machining operations may be performed in either or both of two directions.

One of the objects of the present invention is to provide a novel machine tool having two amply proportioned slides, one for supporting a rotary spindle, and the other for supporting a tool or work fixture, each of said slides being operable in different selective cycles of movement, either independently of or in timed relation to the other slide, to perform machining operations in one or two directions.

Another object is to provide a new and improved machine tool having perpendicularly movable slides, in which the slides may be operated automatically either successively through their respective cycles, or simultaneously in concurrent or alternated sequences of movement.

A general object is to provide a novel machine tool of the foregoing character having wide versatility of the two slide movements so as to adapt the machine for many different selective applications in use.

Still another object is to provide a new and improved machine tool of the foregoing character in which the spindle is controlled, i. e., caused to start, stop and operate at different speeds, in timed relation to the movements of either or both of the machine slides.

Further objects and advantages will become apparent as the description proceeds.

In the accompanying drawings:

Fig. 2 is a plan view of the machine.

Fig. 3 is a front elevational view of the machine.

Fig. 4 is a longitudinal vertical sectional view through one of the machine slides.

Fig. 5 is a fragmentary perspective view of the machine adapted for piston turning, grooving and facing operations.

Fig. 6 is a diagrammatic representation of the hydraulic system for translating the spindle slide of the machine.

Fig. 7 is a diagrammatic representation of the hydraulic system for translating the fixture slide.

Fig. 8a is a diagrammatic representation of the same electric control circuit for the machine shown in Fig. 8, but of a different type to illustrate the lines and contacts in association with their respective coils.

Fig. 9 is a chart indicating the energization of various relay coils and solenoids in the electrical control circuit in successive steps in the machine cycle.

Fig. 10 is a diagrammatic representation of the machine, illustrating the location of different limit switches forming part of the electric control circuit.

Figure 1:
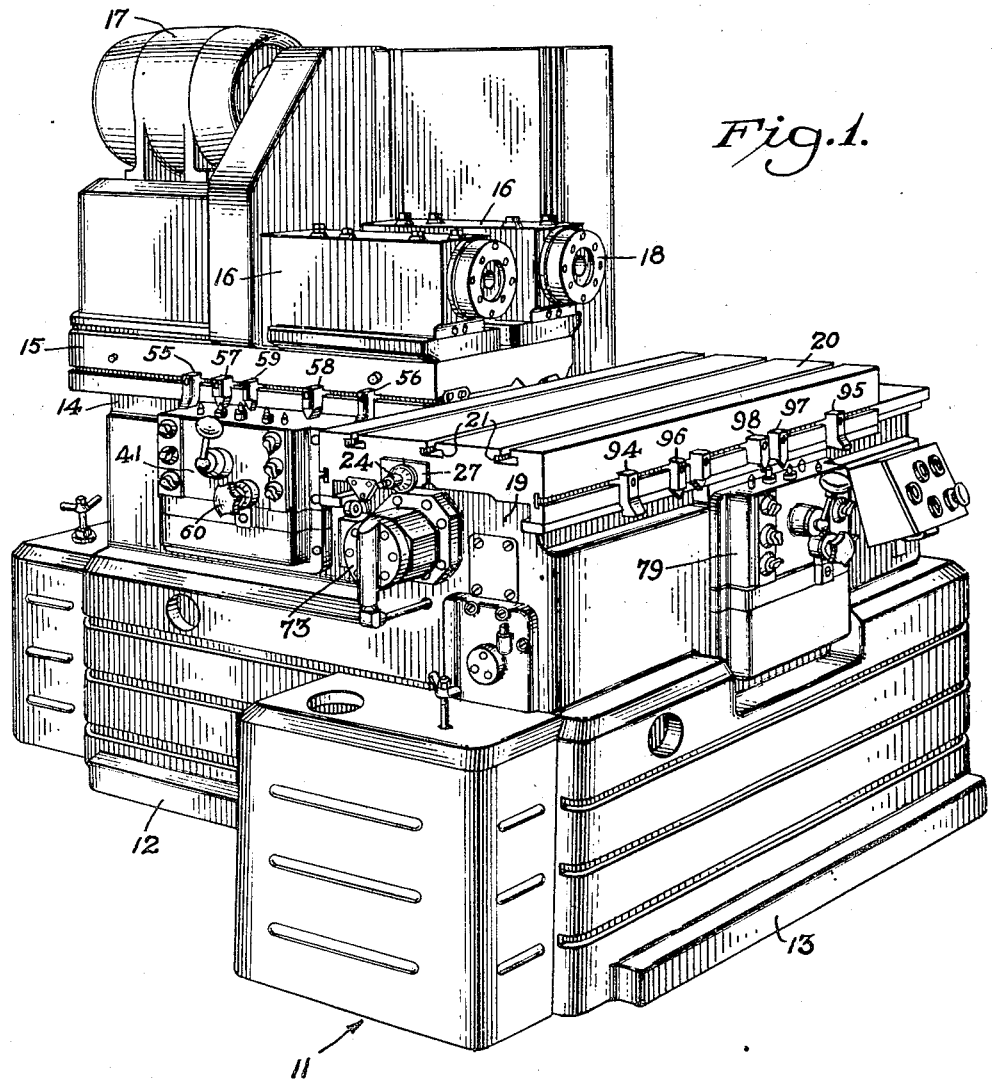
Figure 1 is a perspective view of a machine embodying the features of my invention.

Referring more particularly to the drawings, the machine constituting one form of the invention (Figs. 1 to 4) comprises a base 11 having a longitudinal base section 12 and a perpendicular base section 13 at one end. The longitudinal base section 12 is formed on the top with spaced parallel guideways 14 supporting a reciprocatory table or slide 15. One or more spindles 16 are mounted on the slide 15 for longitudinal translation therewith, and are adapted to be driven through drive connections (not shown) from an electric drive motor 17. In the present instance, the drive motor 17 is of a two-speed type, adapted to drive the spindle or spindles 16 either at a relatively high speed or at a relatively slow speed, depending on the nature of the machining operation to be performed. Each of the spindles 16 extends to the right end of the slide 15, and has a flange 18 to which a cutting tool or workpiece may be suitably secured.

The perpendicular base section 13 is also formed on the top with spaced parallel guideways 19 on which a cross slide 20 is mounted for reciprocation. The slide 20 is formed on the top with parallel longitudinal T-slots 21 by means of which a fixture (not shown) for supporting one or more tools, or one or more workpieces, may be secured in position.

The machine thus comprises the two slides 15 and 20 independently mounted on the base 11 for movements at right angles to each other, and adapted for operation either separately or in timed relation. Each of the slides has relatively large dimensions and is arranged for movement in a cutting traverse.

Adjustable stop or abutment means is provided for positively limiting end positions of translation of the fixture slide 20. In the present instance, this means (Fig. 4) comprises two spaced stops 22 and 23 rigidly mounted on the front and rear ends of the base section 13. Two longitudinal adjusting screws 24 and 25 are rotatably mounted on the underside of the cross slide 20 for movement therewith. Preferably, the innermost ends of the screws 24 and 25 are rotatably supported in a bracket 26 anchored to the underside of the cross slide 20 substantially midway of its ends. The outer ends of the screws 24 and 25 are rotatably anchored in plates 27 secured respectively to opposite ends of the slide 20 and extend therethrough for external actuation. Suitable micrometer dials 28 are mounted on the outer ends of the screws 24 and 25 for indicating the adjustment thereof. Adjustable stops or abutments 29 and 30 are slidably disposed on the underside of the slide 20 in threaded association with the screws 24 and 25, and are adapted respectively for engagement with the fixed stops 22 and 23 upon movement of the slide into its forward position or into its rear position. Each of the movable stops 29 and 30 comprises two contiguous nuts 31 and 32 which are normally pressed apart by interposed compression springs 33 so as to take up backlash, and also to provide accurate alinement between the fixed and movable stops upon engagement thereof.

Positive abutment means are also provided for adjustably limiting the opposite end positions of the spindle slide 15. This means may be the same as the stop means provided for the cross slide 20, and hence is not specifically shown.

Hydraulic transmission for spindle slide

The spindle slide 15 is arranged for translation in a machining cycle of selective rapid traverse and feed speeds in either direction. Normally, the slide 15 has an idle retracted position on the left end of the base section 12 spaced from the cross slide 20, and is movable to the right in a forward cutting stroke, and to the left in a return stroke. The slide may either reverse immediately at the end of the forward cutting stroke, or may dwell there against the positive abutment means in an operative position while the cross slide 20 is translated through some step of its machining cycle.

The transmission for the spindle slide 15 preferably consists of a hydraulic transmission system (see Fig. 6). In the particular form shown, the hydraulic transmission system includes a suitable hydraulic actuator 34 comprising a cylinder 35 fixed in the base section 12 and a piston 36 reciprocable in the cylinder. The piston 36 has a piston rod 37 connected to a bracket 38 on the underside of the slide 15. Suitable fluid lines 39 and 40 open to opposite ends of the cylinder 35, and are adapted to be selectively connected through a hydraulic control panel 41 to a pressure line 42 receiving fluid under pressure from a suitable source, or an exhaust line 43 discharging to a sump 44.

The pressure fluid source comprises a pump 45 adapted to be driven by an electric motor 46 and having an intake line 47 taking fluid from the sump 44. The pump discharges through a filter 48 to the pressure line 42. Interposed in the pressure line 42 is a relief valve 49 discharging back to the sump 44. The relief valve 49 preferably is adjusted to discharge excess fluid during feed operation back to the sump 44, and to supply fluid to the actuator 34 during feed at substantially a constant working pressure.

The hydraulic control panel 41 per se forms no part of the present invention and, therefore, is not disclosed in detail. This panel may be of the specific type disclosed in copending application Serial No. 367,523, filed November 28, 1940, by Max A. Mathys (Patent No. 2,368,259, Jan. 30, 1945). The panel 41 comprises direction pilot valves 50 and 51, feed and rapid traverse pilot valves 52 and 53, and a stop and start pilot valve 54 adapted for selective engagement respectively by suitable dogs 55 to 59 adjustably mounted on the side of the spindle slide 15 for movement therewith. Also enclosed in the panel 41 is a manual control valve (not shown) having an operating hand knob 60. As more fully disclosed in said copending application, the manual control valve is operable at any time to reverse the direction of table movement independently of the dog control for the pilot valves 50 and 51, and has three positions of adjustment, namely, an intermediate position in which the direction pilot valves 50 and 51 are in control, and opposite end positions for effecting movement of the slide 15 either to the right or to the left.

When it is desired that the spindle slide 15 dwell at opposite ends of its translation, instead of reversing immediately, the dogs 55 and 56 are removed or adjusted out of operative position, and the manual control valve is utilized for initiating both the forward and return movements of the slide under the control of a remote control valve 61 as shown in Fig. 6. The remote control valve 61 has suitable port connections with a branch 62 of the pressure line 42, and with a drain line 63 leading to the sump 44, and also has port connections with two fluid supply lines 64 and 65 leading to the panel 41. When fluid under pressure is supplied to one or the other of the lines 64 and 65, the manual control valve is shifted respectively into one or the other of its end positions.

The remote control valve 61 is adapted to be shifted selectively into opposite end positions under the control of two solenoids SV1 and SV2. When the solenoid SV1 is energized, the valve 61 is shifted to connect the lines 64 and 65 respectively to the pressure and drain lines 62 and 63, thereby effecting adjustment of the manual control valve into one end position to cause the slide 15 to advance in a cutting stroke to the right until stopped by the positive abutment means. Upon energization of the solenoid SV2, the remote control valve 61 is shifted into the other end position, thereby reversing the connections of the lines 64 and 65 to the lines 62 and 63 to effect adjustment of the manual control valve into the other end position so as to cause translation of the slide 15 to the left in a return movement until stopped in retracted position by the positive abutment means.

It will be understood that the speed of the slide 15 may be varied by the pilot valves 52 and 53 under the control of the dogs 57 and 58. Thus, the slide 15 may be advanced at a slow cutting feed, as for example in a turning operation on the workpiece, and may be returned at a rapid traverse rate.

The direction pilot valves 50 and 51 may also control the operation of the spindle 16. Thus, two hydraulic cylinder and piston actuators 66 and 67 are connected in parallel through lines 68 and 69 to the panel 41. The actuator 66 controls a limit switch 70 in the electric circuits for the spindle drive motor 17. The actuator 67 controls a spindle brake 71. The arrangement is such that when the slide 15 is moving to the right, the switch 70 is closed and the brake 71 is released to effect rotation of the spindle 16, and when the slide 15 is moving to the left, the switch 70 is open and the brake 71 is applied to stop the spindle 16.

If desired, a lubricating pump 72 may be connected across the lines 39 and 63 for operation when the slide 15 is moving forwardly to the right.

Hydraulic transmission for fixture slide

The fixture slide 20 is also arranged for translation either in an indexing movement or in a machining cycle of selective rapid traverse and feed speeds in either direction. Normally, the slide 20 has an idle position at the forward end of its travel, and is movable rearwardly in a cutting stroke, and forwardly in a return stroke. Usually, the fixture or cross slide 20 is caused to dwell against the positive abutment means at either end of its travel while the spindle slide 15 is being translated forwardly in the cutting stroke, or to the left in a return stroke.

The transmission for the fixture slide 20 preferably consists of a hydraulic transmission system (see Fig. 7) generally similar to that employed for translating the spindle slide 15. More particularly, the hydraulic transmission system includes a hydraulic actuator 73 comprising a cylinder 74 fixed in the base section 13 and a piston 75 reciprocable in the cylinder. The piston 75 has a piston rod 76 extending longitudinally of the slide 20 and connected at its inner end to the bracket 26 on the underside of the slide 20. Suitable fluid lines 77 and 78 open to opposite ends of the cylinder 74, and are adapted to be selectively connected through a hydraulic control panel 79 to a pressure line 80 receiving fluid under pressure from a suitable source, or an exhaust line 81 discharging to a sump 82.

The pressure fluid source comprises a pump 83 adapted to be driven by an electric motor 84 and having an intake line 85 taking fluid from the sump 82. The pump discharges through a filter 86 to the pressure line 80. Interposed in the pressure line 80 is a relief valve 87 discharging through a line 88 back to the sump 82 and adapted to maintain a constant working pressure during feed operation.

The hydraulic control panel 79 is the same as the panel 41 and comprises direction pilot valves 89 and 90, feed and rapid traverse pilot valves 91 and 92, and a start and stop pilot valve 93, adapted for selective engagement respectively by suitable dogs 94 to 98 adjustably mounted on the side of the fixture slide 20 for movement therewith. As in the case of the control panel 41, the panel 79 includes a manual control valve (not shown) and connected through lines 99 and 100 to a remote control valve 101.

When it is desired that the fixture slide 20 dwell at opposite ends of its translation, instead of reversing immediately, the dogs 94 and 95 are disabled, and the manual control valve is utilized for initiating both the cutting and return movements of the slide under the control of the remote control valve 101 as shown in Fig. 7. The remote control valve 101 is adapted to be shifted selectively into opposite end positions under the control of two solenoids SV3 and SV4. When the solenoid SV3 is energized, the valve 101 is shifted to connect the line 99 to a branch 102 of the pressure line 80, and to connect the line 100 to a drain line 103, thereby effecting adjustment of the manual control valve into one end position to cause the slide 20 to travel rearwardly in a cutting stroke until stopped by engagement of the abutment 30 with the abutment 23. Upon energization of the solenoid SV4, the remote control valve 101 is shifted into the other end position, thereby reversing the connections of the lines 99 and 100 to the lines 102 and 103 to effect adjustment of the manual control valve into the other end position so as to cause translation of the slide 20 forwardly in a return movement until stopped by engagement of the abutment 29 with the abutment 22.

It will be understood that the speed of the slide 20 may be varied by the pilot valves 91 and 92 under the control of the dogs 96 and 97. Thus, the slide 20 may be translated rearwardly at rapid traverse and feed movements, and forwardly in a rapid return movement.

If desired, a lubricating pump 104 may be connected across the lines 72 and 103 for operation when the slide 20 is moving rearwardly.

Machine adaptation to turning, grooving and facing

The machine is shown adapted in Fig. 5 for the turning, grooving and facing of a piston W suitably clamped on the operative end of one spindle 16 on the spindle slide 15.

Mounted on the cross slide 20 is a suitable tool fixture comprising a base plate 104. A turning tool $T_1$ is secured in the free upper end of an oscillatory tool holder 105 pivotally mounted on the base plate 104. The tool holder 105 has a lateral arm 106 urged upwardly by spring-actuated means 107 into engagement with a cam bar 108. One end of the cam bar 108 is connected to the spindle 16 for longitudinal movement therewith, and the other end is slidably supported in a bracket 109 on the base plate 104. The cam bar 108 is so contoured that as the slide 15 is advanced to the right in the cutting stroke, it will cause the tool $T_1$ to turn the periphery of the piston W to the desired size and shape, and particularly with individual diameters for the piston skirt and the spaces between the ring grooves.

Also mounted on the base plate 104 are two tool blocks 110 and 111. The block 110 carries suitable tools $T_2$ for cutting the grooves in the piston W, and the block 111 carries chamfering tools $T_3$. As the fixture slide 20 is translated from the forward position rearwardly in the cutting stroke, the tools $T_2$ first cut the ring grooves in the piston W, and then the tools $T_3$ chamfer certain edges on the grooves and the top edge of the piston. In this operation, the tools $T_2$ and $T_3$ take swipe cuts across the side of the piston. Preferably, the tools $T_2$ are staggered longitudinally of the slide 20 so as to distribute the cutting load.

Mounted for vertical adjustment on the bracket 109 is a tool $T_4$ for facing the end of the piston W. The tool $T_4$ is located substantially in the horizontal axial plane of the spindle 16.

Electrical control circuits

In the machine adaptation illustrated in Fig. 5, the slides 15 and 20 are caused to move in timed relation, and the spindle drive motor 17 is automatically controlled. The control is effected by selectively energizing the valve solenoids SV1, SV2, SV3 and SV4, and certain relays in the circuit for the spindle motor 17.

Figure 8:
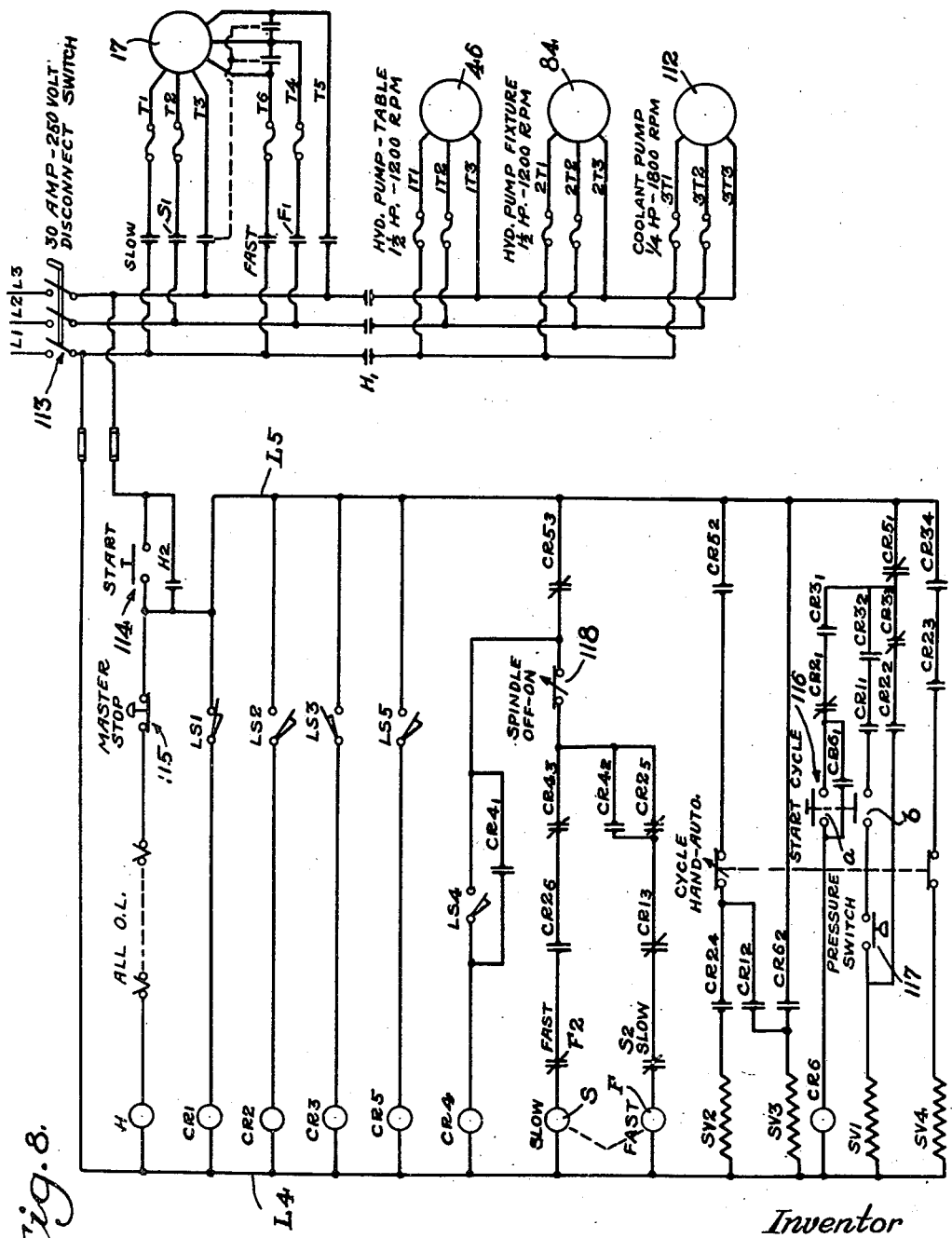
Fig. 8 is a diagrammatic representation of the electric control circuit for the machine.

In the electrical control circuits illustrated in Fig. 8, the various electric motors 17, 46 and 84, and also a coolant pump motor 112, are adapted to be connected to main supply lines $L_1$, $L_2$ and $L_3$, in turn arranged for connection through a main switch 113 to a suitable source of three-phase alternating current. Two auxiliary supply lines $L_4$ and $L_5$ branch from the lines $L_1$ and $L_3$.

The hydraulic pump motors 46 and 84 respectively for the spindle slide 15 and the cross slide 20, and the coolant pump motor 112, are adapted to be connected in parallel to the lines $L_1$, $L_2$ and $L_5$ by a starter having a set of normally open contacts $H_1$, arranged to be closed upon excitation of a relay coil H. These motors are normally operated continuously, and to start them the coil H is connected across the lines $L_4$ and $L_5$ by closing a start switch 114. When the coil H is excited, it closes the contacts $H_1$, and also sealing contacts $H_2$ for maintaining the circuit around the switch 114. The circuit may be interrupted at any time by opening a normally closed master stop switch 115.

The spindle drive motor 17, being of the two-speed type, is adapted to be connected to the main supply lines $L_1$, $L_2$ and $L_3$ to rotate the spindle 16 selectively at a slow speed or a fast speed, by a starter having two parallel sets of normally open contacts $S_1$ and $F_1$, arranged alternately to be closed upon selective excitation respectively of relay coils S and F. Thus, when the coil S is excited, the motor 17 will rotate at a relatively slow speed, and when the coil F is excited, the motor will rotate at a relatively fast speed. Also, when both coils S and F are deenergized, the motor 17 will be idle.

The valve solenoids SV1, SV2, SV3 and SV4, and the spindle relay coils S and F, are controlled selectively by limit switches LS1, LS2, LS3, LS4 and LS5 operable in timed relation to the sequential movements of the spindle table or slide 15 and the cross slide 20. The arrangement is such that, at the start, the spindle slide 15 is in its idle or retracted position to the left, in which position it closes the limit switch LS1, and the cross slide 20 is in its forward position, in which position it closes the limit switch LS3, and the spindle motor 17 is idle. Upon initiating the cycle, the spindle slide 15 is moved forwardly to the right at a feed speed, with the spindle motor 17 operating at a relatively high speed. During the advance of the spindle slide 15, the cross slide 20 dwells in the forward position. Upon movement of the spindle slide 15 into its advanced position, it dwells there and closes the limit switch LS2, and the spindle motor 17 is caused to rotate at a relatively slow speed. The cross slide 20 is now caused to move from its forward position rearwardly in a cutting stroke. At an intermediate point in the rearward movement of the cross slide 20, the limit switch LS4 is closed momentarily, and the spindle motor 17 is again caused to rotate at a relatively high speed. The feed rate of the slide 20 is varied during the cutting stroke. Upon movement of the cross slide 20 into its rear position, it dwells there and closes the limit switch LS5, and the spindle slide 15 is thereupon returned at a rapid traverse rate to its initial retracted position. Simultaneously with the initiation of the return of the spindle slide 15, the spindle motor 17 is stopped, and remains idle during the remainder of the cycle. When the spindle slide 15 reaches its retracted position, the cross slide 20 returns forwardly at a rapid traverse rate to its initial forward position to conclude the machine cycle.

The switches LS1 to LS5 are normally open and are adapted to be closed by suitable cams or dogs on the slides 15 and 20. When closed, the switches LS1, LS2, LS3 and LS5 serve respectively to complete circuits for associated relay coils CR1, CR2, CR3 and CR5 across the supply lines $L_4$ and $L_5$. The switch LS4 when closed serves similarly to complete a circuit for relay coils CR4, provided the slide 20 is not in its rearmost position.

The relay coils CR1 to CR5 are arranged to control associated switch contacts in the electrical control circuits for the slides 15 and 20 and the spindle motor 17 to obtain the desired sequence of machine operations. Thus, relay coil CR1 has normally open contacts $CR1_1$ and $CR1_2$ and normally closed contacts $CR1_3$; relay coil CR2 has normally open contacts $CR2_2$, $CR2_3$, $CR2_4$ and $CR2_6$ and normally closed contacts $CR2_1$ and $CR2_5$; relay coil CR3 has normally open contacts $CR3_1$, $CR3_2$ and $CR3_4$ and normally closed contacts $CR3_3$; relay coil CR4 has normally open contacts $CR4_1$ and $CR4_2$, and normally closed contacts $CR4_3$; and relay coil CR5 has normally open contacts $CR5_2$ and normally closed contacts $CR5_1$ and $CR5_3$. A manually operable start cycle switch 116 is arranged to bridge contacts $a$ and $b$, respectively, in the circuits for a relay coil CR6 and the solenoid SV1.

In the operation of the slides 15 and 20, the cycle is started by closing the start cycle switch 116. At this time, the slide 15 is in retracted position and the slide 20 is in forward position, so that contacts $CR2_1$, $CR3_1$ and $CR5_1$ in the circuit for the starting coil CR6 are closed. Consequently, a circuit is completed for the coil CR6, which immediately closes sealing contacts $CR6_1$ to maintain the circuit around the switch contacts $a$ and contacts $CR6_2$ to complete a circuit for the solenoid SV3. This solenoid insures that the cross slide 20 will be retained in the forward position during the advance movement of the slide 15.

At the start, contacts $CR1_1$ and $CR3_2$ in the circuit for the solenoid SV1 are closed. Assuming that the piston W has been clamped on the spindle 16, a pressure switch 117 in the circuit will be closed so that when the switch 116 is actuated to bridge the contacts $b$, the solenoid SV1 will be energized to shift the valve 61 into starting position. Thereupon, the spindle slide 15 will be advanced toward the tool slide 20 at a feed rate, during which movement the tool $T_1$ will turn the piston W. In the initial movement of the slide 15, the limit switch LS1 is opened to effect deenergization of the coil CR1, and thereby open contacts $CR1_1$ to interrupt the circuit for the solenoid SV1, but the slide will continue to move forwardly since the valve 61 will remain in the adjusted position.

At the end of the advance movement of the spindle slide 15, the limit switch LS2 is closed to energize the relay coil CR2. This opens contacts $CR2_1$ to interrupt the circuit for the starting coil CR6, thus opening contacts $CR6_2$ to interrupt the circuit for the solenoid SV3. The relay coil CR2 closes contacts $CR2_3$, and since contacts $CR3_4$ are closed at this time, a circuit for the solenoid SV4 is completed to shift the valve 101 into position so as to initiate rearward movement of the tool slide 20. In the initial movement of of the slide 20, the relay CR3 is deenergized to cause opening of contacts $CR3_4$, but the slide will continue to move since the valve 101 will remain in the adjusted position. Also, contacts $CR3_3$ are closed, and since contacts $CR2_2$ are closed at this time, a circuit for the solenoid SV1 is reestablished to insure maintenance of the spindle slide 15 in its forward position.

At the end of the rearward movement of the tool slide 20, the limit switch LS5 is closed to energize the relay CR5, thereby opening contacts $CR5_1$ to interrupt the circuit for the solenoid SB1, and closing contacts $CR5_2$ to complete a circuit for the solenoid SV2; the contacts $CR2_4$ being closed at this time. Energization of the solenoid SV2 reverses the valve 81 to effect return of the spindle slide 15 to its initial retracted position. In the initial return movement of the slide 15, the contacts CR2₃ are closed to again energize the solenoid SV4 so as to insure that the slide 20 will remain in its rearmost position. At the end of the return movement of the slide 15, the limit switch LS1 is again closed to energize the relay coil CR1, thereby closing contacts CR1₂, and since contacts CR5₂ are closed at this time, a circuit is completed for the solenoid SV3. Energization of the solenoid SV3 serves to reverse the valve 101 so that the tool slide 20 is returned to its initial forward position. In the initial return movement of the slide 20, the contacts CR5₂ are opened, but the movement will continue since the valve 101 will remain in adjusted position. At the end of the return movement of the tool slide 20, the limit switch LS3 is closed to reestablish the initial condition, and the cycle is completed.

The operation of the spindle 16 is correlated to the movements of the slides 15 and 20, and to this end the relay coils S and F are adapted to be alternately connected across lines L₄ and L₅, or to be both disconnected. The circuit for the coil S includes in series normally closed interlock contacts F₂ operable by the coil F, normally open contacts CR2₆, normally closed contacts CR4₃, a manually controlled switch 118, and normally closed contacts CR5₃. The circuit for the coil F includes in series normally closed interlock contacts S₂ operable by the coil S, normally closed contacts CR1₃ and CR2₅, the control switch 118 and the contacts CR5₃. Normally open contacts CR4₂ are connected in parallel with the contacts CR2₅. When the switch 118 is opened, the automatic spindle control is disabled, and the spindle 16 is idle.

When the limit switch LS4 is closed momentarily at an intermediate point in the rearward travel of the tool slide 20, the coil CR4 is energized, and sealing contacts CR4₁ are closed to maintain the circuit until the coil CR5 is energized at the end of the rearward movement of the slide to open the contacts CR5₃.

At the start of the cycle, with the spindle slide 15 in the retracted position, contacts CR1₃ are open. Since contacts CR2₆ are also open, both coils S and F are deenergized, and the spindle motor 17 is idle. In the initial movement of the spindle slide 15 out of retracted position, the coil CR1 is deenergized. Thereupon, the contacts CR1₃ are closed, and since contacts CR2₅ and CR5₃ are also closed at this time, a circuit for the coil F is completed to cause rotation of the spindle 16 at a relatively high speed. At the end of the movement of the spindle slide 15 in the forward direction, the coil CR2 is energized, and opens contacts CR2₅ to interrupt the circuit for the coil F. The coil CR2 also closes contacts CR2₆, and since contacts CR4₃ and CR5₃ are closed at this time, a circuit is completed for the coil S to effect rotation of the spindle 16 at a relatively slow speed. The spindle 16 continues to rotate at this reduced speed during the initial movement of the cross slide 20. At an intermediate point in its rearward movement, the cross slide momentarily closes the switch LS4 to complete a circuit for the relay coil CR4. This coil immediately closes the sealing contacts CR4₁, and also opens the contacts CR4₃ to interrupt the circuit for the coil S, and closes the contacts CR4₂ to reestablish this circuit for the coil F. Consequently, the spindle 16 is again caused to rotate at the higher speed.

Upon movement of the cross slide 20 into its rearmost position, the limit switch LS5 is closed to energize the coil CR5, and thereby effect opening of the contacts CR5₃, thus interrupting the circuits for both coils S and F to stop the spindle rotation. Likewise, the circuit for the coil CR4 is interrupted.

During the return movement of the spindle slide 15, the coil CR2 is deenergized thus opening the contact CR2₆ in the circuit for the coil S. At the end of the return movement of the slide 15, the contacts CR1₃ are opened, so that during the return movement of the cross slide 20 the spindle 16 continues to remain idle.

I claim as my invention:

1. A machine tool comprising, in combination, a base, a first machine slide mounted on said base for reciprocation in one direction and adapted to support a rotary spindle, a second machine slide mounted on said base for reciprocation in a direction perpendicular to said first mentioned direction and adapted to support a fixture, a drive transmission for translating said first slide in a machining cycle toward and from said second slide, positive stop means for limiting the opposite end positions of said first slide, a drive transmission for translating said second slide in a machining cycle back and forth across said first slide, positive stop means for limiting the opposite end positions of said second slide, and control means for initiating movement of said first slide toward said second slide into one end postion, interlock means operable by said first slide in said one end position for initiating movement of said second slide past said first slide into one end position, interlock means operable by said second slide in its said one end position for initiating return movement of said first slide into its other end position, and interlock means operable by said first slide in said other end position for initiating movement of said second slide past said first slide into its other end position.

2. A machine tool comprising, in combination, a base, a first machine slide mounted on said base for reciprocation in one direction and adapted to support a rotary spindle, a second machine slide mounted on said base for reciprocation in a direction perpendicular to said first mentioned direction and adapted to support a fixture, a drive transmission for translating said first slide in a machining cycle toward and from said second slide, positive stop means for limiting the opposite end positions of said first slide, a drive transmission for translating said second slide in a machining cycle back and forth across said first slide, positive stop means for limiting the opposite end positions of said second slide, automatic control means for said transmissions operable to effect interrelated movements of said slides in cutting and return strokes, control means operable by one of said slides for effecting starting of said spindle for said cutting strokes, and control means operable by the other of said slides for effecting stopping of said spindle for said return strokes.

3. A machine tool comprising, in combination, a base, a first machine slide mounted on said base for reciprocation in one direction and adapted to support a rotary spindle, a second machine slide mounted on said base for reciprocation in a direction perpendicular to said first mentioned direction and adapted to support a fixture, a drive transmission for translating said first slide in a machining cycle toward and from said second slide, positive stop means for limiting the opposite end positions of said first slide, a drive transmission for translating said second slide in a machining cycle back and forth across said first slide, positive stop means for limiting the opposite end positions of said second slide, automatic control means for said transmissions operable to effect movements of each of said slides in cutting and return strokes, and control means operable by one of said slides at an intermediate point in the cutting stroke thereof for effecting a change in the speed of spindle rotation.

4. A machine tool comprising, in combination, a base, a first machine slide mounted on said base for reciprocation in one direction and adapted to support a rotary spindle, a second machine slide mounted on said base for reciprocation in a direction perpendicular to said first mentioned direction and adapted to support a fixture, a drive transmission for translating said first slide in a machining cycle toward and from said second slide, positive stop means for limiting the opposite end positions of said first slide, a drive transmission for translating said second slide in a machining cycle back and forth across said first slide, positive stop means for limiting the opposite end positions of said second slide, automatic control means for said transmissions operable to effect movements of each of said slides in cutting and return strokes, and control means operable by said slides for effecting variations in the speed of spindle rotation.

5. A machine tool comprising, in combination, a base, a first machine slide mounted on said base for horizontal reciprocation in one direction, a rotary spindle mounted on said slide for movement therewith and extending axially in the direction of reciprocation, said spindle being adapted to support a workpiece for rotary drive and axial translation, a second machine slide similar to said first slide and mounted on said base for horizontal reciprocation in a direction perpendicular to said first mentioned direction, a tool fixture mounted on said second slide for translation therewith and including two sets of tools, the tools of one set being adjustable on said fixture, cam means guided on said base and movable with said first slide for controlling the position of the tools of said first set in timed relation to the translation of said first slide, transmission means for translating said first slide in a machining cycle to traverse the work through cutting engagement with the tools of said one set, transmission means for translating said second slide in a machining cycle to traverse the tools of the other set through cutting engagement with the work, and interlock means controlled by said slides for effecting movement of said first slide through a cutting stroke into a stop position, then movement of said second slide through an independent cutting stroke into a stop position, and then movement of said first and second slides successively in return strokes into initial position.

6. A machine tool comprising, in combination, a base, a first machine slide mounted on said base for horizontal reciprocation in one direction, a rotary spindle mounted on said slide for movement therewith and extending axially in the direction of reciprocation, said spindle being adapted to support a workpiece for rotary drive and axial translation, a second machine slide similar to said first slide and mounted on said base for horizontal reciprocation in a direction perpendicular to said first mentioned direction, a tool fixture mounted on said second slide for translation therewith and including two tools, transmission means for translating said first slide in a machining cycle to traverse the work through cutting engagement with one of said tools, transmission means for translating said second slide in a machining cycle to traverse the other tool through cutting engagement with the work, and interlock means controlled by said slides for effecting movement of said first slide through a cutting stroke into a stop position, then movement of said second slide through an independent cutting stroke into a stop position, and then movement of said first and second slides successively in return strokes into initial position.

CURTIS T. DARE.

REFERENCES CITED

The following references are of record in the file of this patent:

UNITED STATES PATENTS

| Number | Name | Date |
|---|---|---|
| 1,249,275 | Dodge et al. | Dec. 4, 1917 |
| 1,302,395 | McCarty | Apr. 29, 1919 |
| 1,942,092 | Gallimore | Jan. 2, 1934 |
| 1,976,108 | Archea | Oct. 9, 1934 |
| 2,028,727 | Perry et al. | Jan. 21, 1936 |
| 2,029,335 | Oberhoffken et al. | Feb. 4, 1936 |
| 2,030,335 | Svenson | Feb. 11, 1936 |
| 2,040,872 | Oberhoffken | May 19, 1936 |
| 2,102,655 | Strawn | Dec. 21, 1937 |
| 2,118,021 | Curtis | May 17, 1938 |
| 2,118,025 | Curtis | May 17, 1938 |
| 2,192,822 | Wickman | Mar. 5, 1940 |
| 2,217,671 | Coffin et al. | Oct. 15, 1940 |
| 2,251,015 | Gallimore | July 29, 1941 |
| 2,255,739 | Curtis | Sept. 9, 1941 |
| 2,263,404 | Armitage et al. | Nov. 18, 1941 |
| 2,266,829 | Svenson | Dec. 23, 1941 |
| 2,274,230 | Bechler | Feb. 24, 1942 |
| 2,368,061 | Wortendyke | Jan. 23, 1945 |